INVENTOR
FRANKLYN M. COLLINS
BY
ATTORNEY

United States Patent Office 3,488,767
Patented Jan. 6, 1970

3,488,767
FILM RESISTOR
Franklyn M. Collins, Lewiston, N.Y., assignor to Air Reduction Company, Incorporated, New York, N.Y., a corporation of New York
Original application May 17, 1965, Ser. No. 456,119, now Patent No. 3,404,032, dated Oct. 1, 1968. Divided and this application June 14, 1968, Ser. No. 737,227
Int. Cl. H01c 7/00, 9/00
U.S. Cl. 338—300  4 Claims

ABSTRACT OF THE DISCLOSURE

A resistor on a nonconductive vane has a continuous two portion coating. A first portion of the coating is relatively resistive and the second portion relatively insulative.

---

Figure 1:
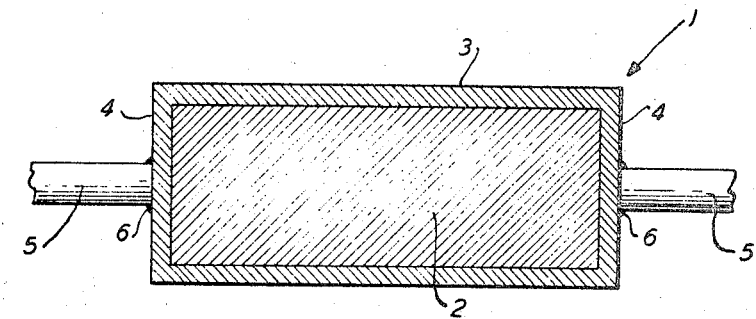

This application is a division of my co-pending application Ser. No. 456,119, filed May 17, 1965 and entitled "Film Resistor and Method of Making the Same," now Patent No. 3,404,032 issued Oct. 1, 1968.

This invention relates to an electrical resistor and a method of making the same; and more particularly it relates to an electrical film resistor which comprises a conductive film or coating as the resistance element deposited on a non-conductive substrate, and a method of adjusting the resistance of the resistor by rendering certain portions of the resistance element relatively non-conducting.

It should be understood that when I refer to "conductive films" I intend to include coatings of metal films, coatings of metal oxides such as tin oxide, titanium oxide, tantalum oxide, etc., and coatings which consist of metal oxides dispersed in glass to form a conductive coating such as disclosed, for example, in United States Patent No. 3,052,573. I also intend to include any other conductive films which may be converted to a high resistance form in accordance with the novel method hereinafter described.

In the manufacture of electrical resistors of the type comprising a thin carbon film on the surface of a cylindrical member of ceramic material, it is well known to increase the resistance value of the resistor by cutting a groove through the film and around the substrate in a helical configuration to increase the resistance path. One well known method of cutting such a groove in carbon is by burning the carbon film as it is slowly rotated past a flame. More recent electrical resistors, which consist of a flat, cylindrical, or other geometric shape substrate having a metal or metal oxide conducting film applied thereto, could not be adjusted by burning away portions of the conducting film. It has therefore been necessary to adjust the resistance of these resistors by mechanically removing portions of the resistive film in a predetermined pattern. One well-known method of cutting grooves on a cylindrical type film resistor is by rotating and translating the resistance element across a cutting or grinding wheel as shown in United States Patent No. 2,405,485. Another method is by sand blasting the groove as shown in United States Patent No. 2,743,554. In the case of films deposited on flat substrates, it is common to chemically etch the film into a zigzag pattern ot raise its resistance.

The most common method of cutting the groove in a film which is deposited on a cylindrical substrate is by means of a high-speed abrasive wheel. Several disadvantages are inherent in this method which are related to local temperatures generated during the process, mechanical vibrations, and the difficulty of obtaining a satisfactory smooth edged groove. The overall result is a "land" of rapidly fluxing width which results in local overheating and consequent deterioration of the element during service.

One of the newer and more interesting types of films which has shown great promise as a resistance element is an oxide film such as tin oxide. These are usually one-to-two orders of magnitude thicker than metal or carbon films of similar resistances and therefore resist certain film removal techniques such as sand blasting or arc evaporation. Another interesting resistance film, which I shall also refer to as a metal oxide film, is the metal oxide dispersed in glass to form an inorganic coating such as, for example, disclosed in the aforementioned United States Patent No. 3,052,573.

My invention consists in discovery that metal oxide conductive films may be converted to a relative non-conductive form, which eliminates the necessity of removing portions of the film. I have observed that by raising the temperature of selected portions of these films to certain temperatures, the selected film portions are rendered essentially non-conducting. For example, the resistance of a tin oxide coating on a cylindrical substrate may be adjusted merely by rotating the substrate and film past a controlled heat source of sufficient magnitude to render certain prescribed areas of the film nonconductive. Since no material is removed, this results in the coating on the substrate having a smooth exterior surface without the grooves which are produced when portions of the material must be removed by prior art methods to adjust the resistance of the resistor.

The advantages ensuing from my novel method of converting selected portions of the conductive film to a relatively nonconductive form by heat treatment of the film are based on the fact that the film and substrate are left mechanically intact after treatment. Rough, ragged, and cracked edges of the film which are produced by former mechanical methods of spiraling, such as by grinding, are not left exposed and do not develop localized heating when the resistor is electrically loaded in service. Also, a known fault of the mechanically formed groove is that it permits the absorption of a film of water onto the surface of the groove which has been found to result in electrolytic action between adjacent spirals, further deteriorating the resistance element. In addition, the localized heating technique of my invention does not necessarily require direct mechanical contact to the film surface, and this relieves the necessity for very precise dimensional stability on the siparaling mechanism. Mechanical spiraling of the prior art must now be done with very exacting requirements on vibration, substrate diameter, tolerance, etc., to avoid harmful variation in such maters as groove width, depth, and uniformity.

While the foregoing descripton of my novel method of rendering selected portions of a conductive film to a substantially less conductive form has been directed to spiraling of a cylindrical film, it should be understood that my method may be applied to form resistors of many other shapes and forms such as a zigzag pattern on flat substrates.

Figure 2:
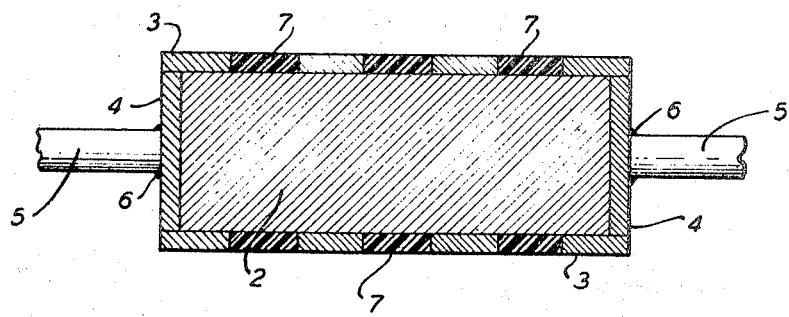

It is therefore an object of this invention to produce an electrical resistor. It is an additional object of this invention to produce an electrical film resistor which has been adjusted to a predescribed resistance value without removal of any of the conductive film. It is another object of this invention to provide a novel method for rendering conducting films relatively non-conductive. It is a further object of this invention to provide a method of adjusting the value of a resistor by rendering certain prescribed areas of the resistance material essentially non-conductive. It is still another object of the invention to provide a method of producing a spiral shaped pattern of essentially non-conducting film and a corresponding spiral shaped pattern of conducting film on a cylindrical resistor. Other objects, features, and advantages of this invention will be readily apparent from consideration of the following specification relating to the annexed drawings in which:

FIG. 1 is a cross-sectional view of a cylindrical substrate having a conductive coating or film deposited thereon; and FIG. 2 is a cross-section of the resistor shown in FIG. 1 after spiraling of the resistor.

Referring to the drawings, FIG. 1 shows a sectional view of a resistor 1 having a cylindrical ceramic substrate 2 and a conductive film or coating 3 deposited thereon. In order to facilitate connection of the resistor into a circuit, terminal means are shown wherein the conductive coating 4 has been applied to the ends of the substrate and leads 5 have been suitably attached to the conductive end coating as by soldering or welding as shown at 6. The conductive coating on the end portion of the substrate is either integral with or in electrical contact with the conductive film 3. The conducting portion 4 may be of the same composition as the resistor conducting material 3 or it may be any other suitable conducting material such as gold, silver, etc.

FIG. 2 shows a sectional view of the resistor of FIG. 1 after the resistance value of the resistor has been adjusted by spiraling with my novel process hereinafter described. The physical shape of the resistor shown in FIG. 2 is identical to the resistor shown in FIG. 1. However, certain portions of the conductive film 3 of FIG. 1 have been rendered essentially non-conductive as shown at 7 in FIG. 2 to adjust the value of the resistor. In addition to the method by which leads 5 are electrically connected to the conducting portion 3, conventional end caps such as shown in United States Patent No. 3,107,337, may be used to facilitate connection to electrical circuits.

The spiral 7 of FIG. 2 is produced by passing the resistor of FIG. 1 past a localized heat source and at the same time rotating the resistor. The relative movement of the heat source and the resistor may be accomplished by any suitable apparatus such as, for example, that disclosed in United States Patent No. 2,838,427. The localized heat used for converting the formerly conducting film to a non-conductive film forms no part of this invention and may be produced by several means, such as a suitable focused electron beam, an arc image furnace, an arc projected (carbon arc and focusing optics) furnace, a miniature hydrogen-oxygen flame, or an electric arc struck between the conducting film surface and a moving electrode. Many other heat sources may be advantageously used as long as the source may be properly focused to control the width of the path on the resistor which is heated.

It is not essential that the film portion 7 be rendered perfectly insulating. A leakage current of as much as a few percent, depending upon the particular use of the resistor, can be easily tolerated between the film portion 7 and the film portion 3, since the leakage current is electronic current in contrast to the harmful ionic currents which may occur within certain substrate materials. It should therefore be understood that when I speak of the film portion which is heated as being essentially non-conductive, I mean that which has a very high resistance as compared to the portion of the film which is not heated.

The mechanism of conversion of the metal oxide from a conductive to an essentially non-conductive form by the heat treatment of the conductive metal oxide is not conclusively known. It is believed to involve an oxidation or reordering of the lattice structure. For example, where the film is stannic oxide, the stannic oxide is believed to be conductive by virtue of having a deficiency of oxygen (either vacant oxygen lattice sights or interstitial tin ions), i.e. nonstoichiometric. Heating the film to an elevated temperature such as 1000° C. may produce a reordering of defects in the lattice or a vary rapid reoxidation of the material closer to stoichiometric proportions at which the film is rendered relatively non-conductive, i.e. the film is converted to the dielectric form. I have found, for example, that a stannic oxide film strip having an initial resistance of 100 ohms has a resistance of approximately 400,000 ohms after treatment at 1000° C. for a short period of time, such as one second or less. In other words, the resistance was increased by a factor of 4,000.

If the conductive film is in inorganic film consisting of a metal oxide in glass, the conduction of the film is believed to be due to the distribution of the metal oxide in crystalline form throughout the glass matrix. I have treated a conductive film of thallium oxide dispersed in glass such as described in my copending patent application Ser. No. 456,119 entitled Film Resistor and Method of Making the Same, at a temperature exceeding 650° C. for approximately 30 seconds and have found the treated portion to be rendered essentially non-conductive. Before treatment, the film resistance was approximately 1,000 ohms and after treatment the film resistance was approximately 20 million ohms, an increase in resistance by a factor of 20,000. It is believed that the heat treatment of my method destroys the crystalline structure of the conducting film and renders the film amorphous, thus producing an essentially non-conductive glaze.

It is to be understood that the cylindrical resistor illustrated in FIGS. 1 and 2 of the drawing are illustrated only as an example of the particular shape of film resistor to which my novel method is applicable. The resistor may take many other conventional forms, such as for example, a resistor printed on a flat substrate.

I claim:

1. A film resistor comprising a non-conductive substrate, a continuous coating of uniform thickness on said substrate, a first portion of said coating being conductive and forming the resistive element of said resistor, a second portion of said coating being essentially non-conductive and contiguous with said conductive portion, and electrical terminal means connected to opposite ends of the conductive portion of said coating.

2. An adjusted film resistor comprising: a non-conductive cylindrical substrate, a conductive film of thallium oxide dispersed in a glass binder coating said substrate, said thallium oxide film including a continuous helical portion therein in which said thallium oxide and said glass are in an amorphous state whereby said spiral portion is essentially non-conductive, and electrical means connected to opposite ends of said conductive film.

3. An adjusted film resistor comprising:
   an electrically non-conductive substrate bearing electrical terminal means and a film of thallium oxide dispersed in a glass matrix therebetween, said film including:
   (1) a continuous conductive portion electrically connecting said terminal means and characterized by the presence therein of said thallium oxide in a crystalline state, and
   (2) relatively non-conductive portions contiguous to said conductive portions and characterized by the presence therein of said thallium oxide in a state of combination with said glass matrix which renders the film in said portions amorphous.

4. A film resistor according to claim 1, wherein said substrate is a cylinder bearing said terminal means at the opposite ends thereof, and wherein said conductive portion of said coating forms a continuous spiral path about said cylinder.

References Cited

UNITED STATES PATENTS 2,984,589  5/1961  Feldman _____ 117—212
3,048,914  8/1962  Kohring _____ 338—273 X ELLIOT A. GOLDBERG, Primary Examiner U.S. Cl. X.R.

117—212; 338—195, 308